United States Patent [19]

Dahlquist

[11] Patent Number: 5,761,965
[45] Date of Patent: Jun. 9, 1998

[54] INDUSTRIAL ROBOT WITH ARTICULATED HOLLOW ROBOT ARMS

[75] Inventor: Håkan Dahlquist, Västerås, Sweden

[73] Assignee: ASEA Brown Boveri AB, Västerås, Sweden

[21] Appl. No.: 262,978

[22] Filed: Jun. 21, 1994

[30] Foreign Application Priority Data

Jul. 2, 1993 [SE] Sweden .................................. 9302288

[51] Int. Cl.$^6$ ...................................................... G05G 11/00
[52] U.S. Cl. ........................ 74/490.03; 74/490.01; 901/26; 901/28
[58] Field of Search ...................... 74/490.01, 490.03, 74/490.05, 490.06; 901/26, 28, 29

[56] References Cited

U.S. PATENT DOCUMENTS

| | | | |
|---|---|---|---|
| 4,690,012 | 9/1987 | Dahlquist et al. | |
| 4,697,472 | 10/1987 | Hiyane | 74/490.02 |
| 4,703,668 | 11/1987 | Peter | 74/490.06 |
| 4,911,033 | 3/1990 | Rosheim et al. | 74/490.03 |
| 4,997,413 | 3/1991 | Dahlquist | |

FOREIGN PATENT DOCUMENTS

| | | |
|---|---|---|
| 0 299 551 | 1/1989 | European Pat. Off. |
| 41 08 262 C2 | 7/1993 | Germany |

Primary Examiner—Charles A. Marmor
Assistant Examiner—David M. Fenstermacher
Attorney, Agent, or Firm—Watson Cole Stevens Davis, P.L.L.C.

[57] ABSTRACT

A hollow industrial robot, especially suitable for process work such as spot and arc welding, sealing, painting, glueing, laser machining, etc., has a tubular lower robot arm, the lower end of which is pivotably journalled in a robot stand about a preferably horizontal first axis and is rotatably journalled about a second axis coinciding with the longitudinal axis of the arm. A tubular upper robot arm is articulately connected to the upper end of the lower robot arm via an articulated joint member in the form of a tubular sleeve obliquely cut off at both ends. The articulated joint member is journalled in the lower robot arm and is rotatable about a third axis, which intersects the second axis. The upper robot arm is journalled on the articulated joint member and is rotatable about a fourth axis, which intersects the third axis. The upper end of the lower robot arm is secured to a first conical toothed wheel, which engages with a second conical toothed wheel secured to the rear end of the upper robot arm.

5 Claims, 3 Drawing Sheets

INDUSTRIAL ROBOT WITH ARTICULATED HOLLOW ROBOT ARMS

TECHNICAL FIELD

The present invention relates to an industrial robot of the kind described in the preamble to claim 1. The robot has a lower tubular robot arm which, at its lower end, is pivotably journalled in a robot stand around a preferably horizontal first axis and rotatably journalled around a second axis coinciding with the longitudinal axis of the arm. An upper tubular robot arm is articulately connected to the upper end of the lower robot arm via an articulated joint member in the form of a tubular sleeve obliquely cut off at both ends. The articulated joint member is journalled in the lower robot arm and is rotatable around a third axis, which intersects the second axis.

A robot according to the present invention is hollow and therefore especially suitable for process operations such as spot and arc welding, sealing, painting, glueing, laser machining, etc. The accessibility in narrow spaces becomes especially good by the possibility of drawing process cables inside the robot. Further, the internally drawn cables result in very high performance of the robot, since the uncontrollable tossing motions, which may occur in externally arranged cables at fast movements of the robot tool, need not be taken into consideration.

BACKGROUND ART

Industrial robots of hollow design are previously known, for example from European patent application 0 299 551. In the robot design described therein, the driving units for all the arm and wrist movements are arranged in the robot foot and connected to their respective members through a plurality of coaxially arranged, rotatably journalled tubular shafts. At a given diameter of the inner cable channel, a relatively large outer diameter of the robot arms is inherent in this design, which deteriorates the accessibility in narrow spaces. Another drawback with this known design is that the upper robot arm cannot be swung in a vertical plane upwards/backwards. Therefore, the robot requires relatively large space in the lateral direction if it is to pick up objects or carry out work operations on the back of the robot. This is a disadvantage especially in such applications where it is desired to place several robots close to each other for simultaneously carrying out, for example, welding operations in a production line for car bodies.

Hollow robot wrists, suitably for use in robots of the type to which the invention relates, are previously known, for example from U.S. Pat. No. 4,690,012. A hollow motor/gear package for rotation of the tool attachment rotatably journalled in the wrist is previously known from U.S. Pat. No. 4,997,413.

SUMMARY OF THE INVENTION

The object of the present invention is to provide a hollow industrial robot of the type described in the introductory part of the description, which does not suffer from the above-mentioned drawbacks of comparable, previously known designs. The new robot design is, for example, intended to make possible the installation of several robots of this design relatively close to each other along a production line to simultaneously carry out, for example, welding operations on car bodies without crashing with each other. A robot with these properties is achieved according to the invention with a design with the characteristic features described in claim 1. By the special articulated joint between the two arms of the robot, the upper robot arm can be swung both in a vertical plane upwards/backwards and in the lateral direction, without the robot stand having to be rotatable. This makes possible great flexibility with respect to location and the current operating range. A further advantage of the new design is that the process cables, which may comprise electric wires and hoses for, for example, cooling water, compressed air, etc., can be made simple and readily replaceable. For arc welding this is a requirement. A simple cable arrangement is possible to use because the bending radii of the hollow channel are large. The cables are readily replaceable by the possibility of setting the robot in a position in which the hollow channel is completely straight, which is not possible with the robot according to the above-mentioned European application 0 299 551.

BRIEF DESCRIPTION OF THE DRAWINGS

The invention will be explained in greater detail by describing an embodiment with reference to the accompanying drawings, wherein.

DESCRIPTION OF THE PREFERRED EMBODIMENT

Figure 1:
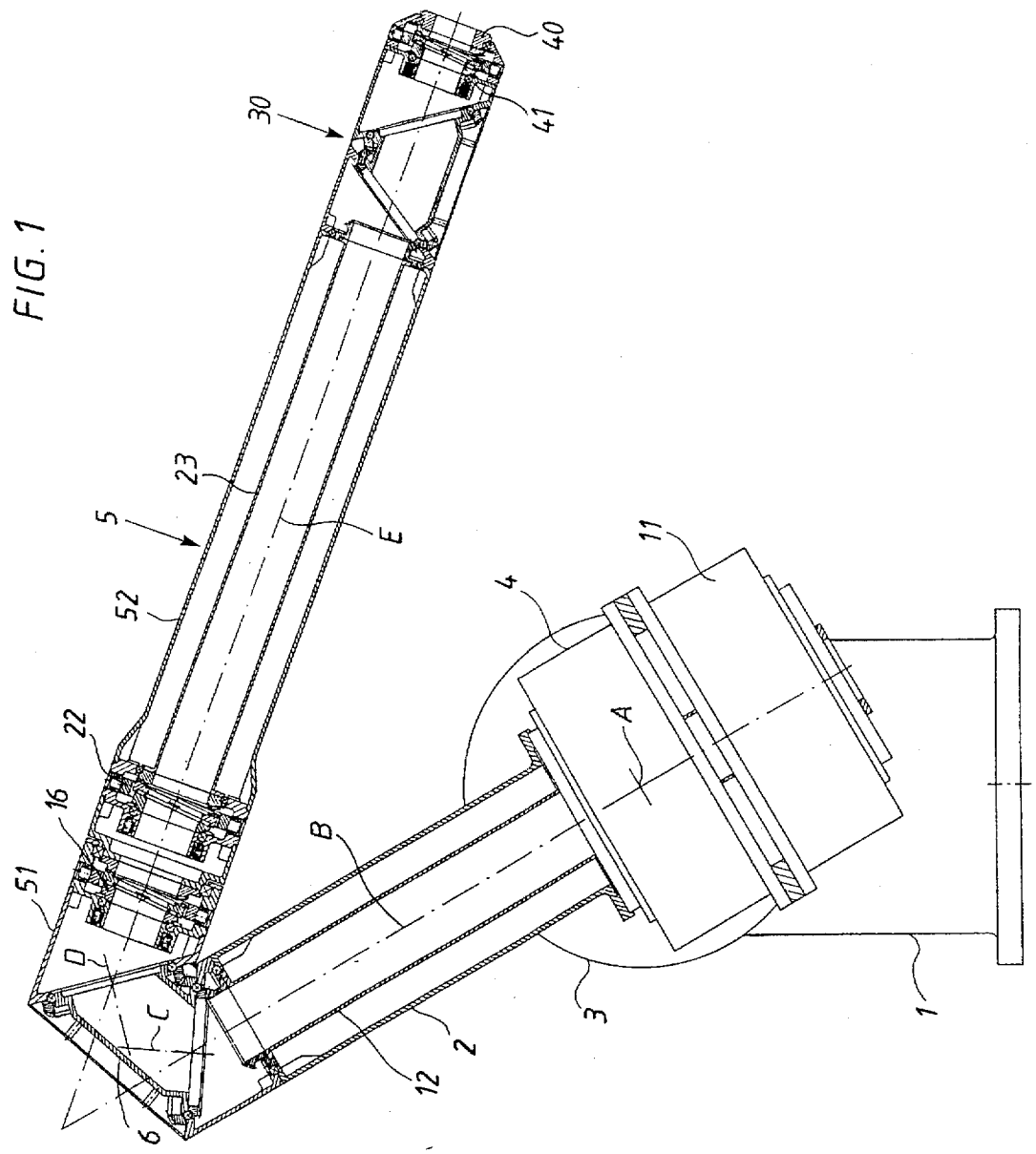
FIG. 1 is a side view and a partial axial section of an industrial robot according to the present invention.
Figure 2:
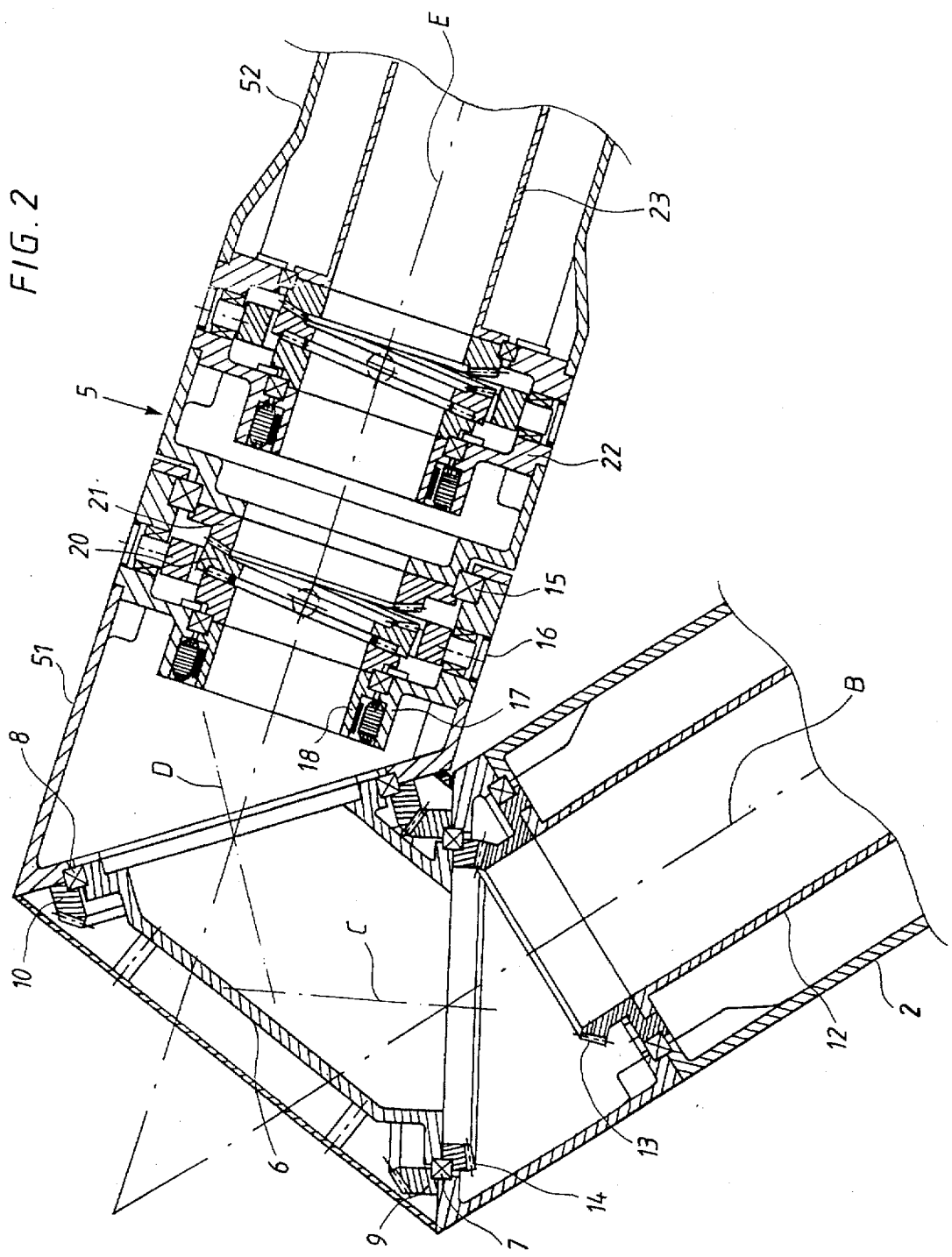
FIG. 2 shows in an enlarged axial section the articulated joint between the two arms of the robot.
Figure 3:
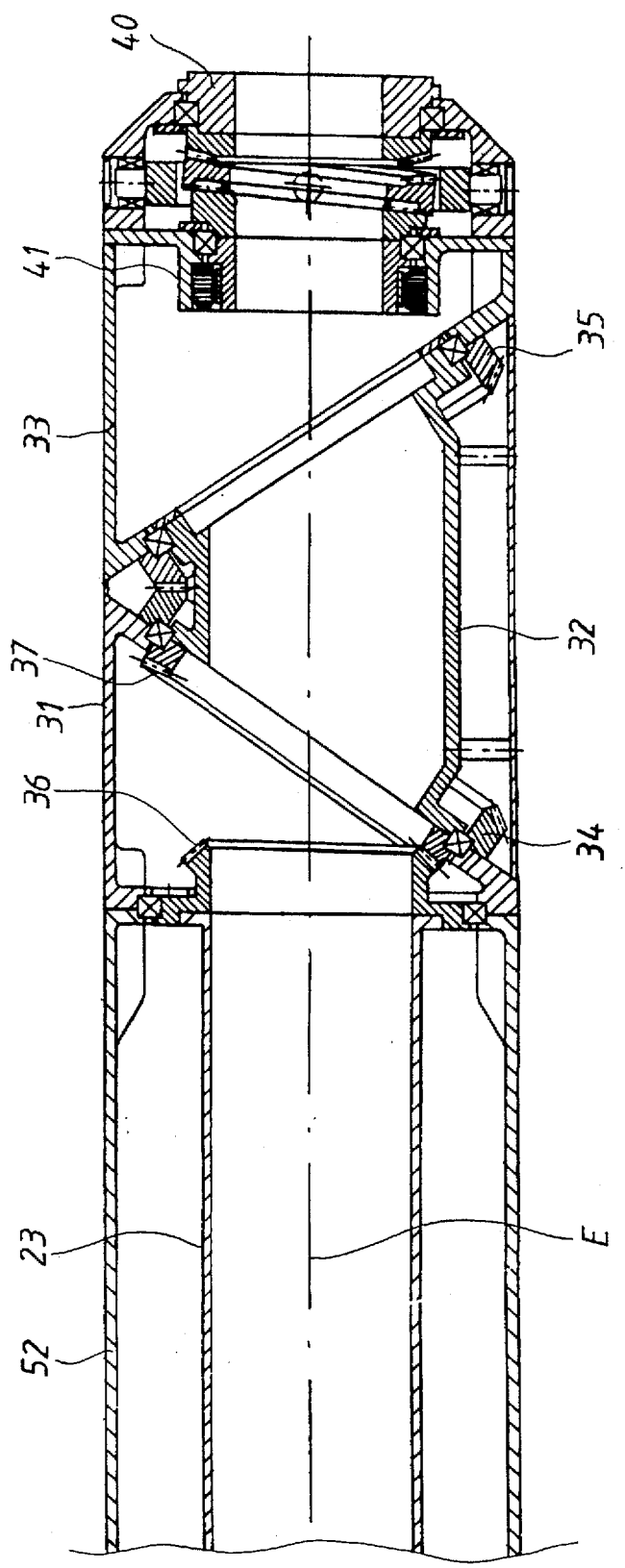
FIG. 3 shows in the same way the wrist of the robot.

The industrial robot shown in FIG. 1 is designed with a robot stand 1 in which a tubular lower robot arm 2 is pivotably journalled around a horizontal first axis A. The pivoting of the robot arm 2 is brought about with the aid of a first driving unit 3 mounted on the stand 1 and consisting of a driving motor with a reduction gear. The lower robot arm 2 is also rotatably journalled around a second axis B coinciding with the longitudinal axis of the arm. The rotation of the lower arm 2 around the axis B is brought about with the aid of a second driving unit 4 mounted at the lower end of the arm and consisting of a driving motor with a reduction gear.

A tubular upper robot arm 5 is articulately connected to the upper end of the lower robot arm 2 via an articulated joint member 6 in the form of a tubular sleeve obliquely cut off at both ends. The lower robot arm 2 has an obliquely cut-off upper end made with a seat for a bearing 7, in which the articulated joint member 6 is journalled for rotation around a third axis C, which intersects the second axis B.

The upper robot arm 5 is journalled on a bearing 8 fixed at the articulated joint member 6 for rotation about a fourth axis D, which intersects the third axis C. A first annular conical toothed wheel 9 is secured to the obliquely cut-off upper end of the lower robot arm and forms a fixing ring for the bearing 7. This toothed wheel 9 is in engagement with a second annular, conical toothed wheel 10, which is secured to the rear end of the upper robot arm and forms a fixing ring for the bearing 8.

The rotation of the articulated joint member 6 is brought about with the aid of a third driving unit 11 which is arranged at the lower end of the lower robot arm 2 and which may be of the same design as the second driving unit 4. The third driving unit 11 is connected to the articulated joint member 6 via tube 12 rotatably journalled in the lower robot arm, the upper part of this tube being secured to a third annular, conical toothed wheel 13. This toothed wheel 13 is in engagement with a fourth annular, conical toothed wheel 14, which is secured to the articulated joint member 6 and forms a fixing ring for the bearing 7.

With the shown articulated design, it is possible, by coordinated control of the driving units 4 and 11, to cause the upper robot arm 5 to swing up over the robot and down on the back substantially the same distance as on the front. This swinging motion can take place in one and the same vertical plane, which makes it possible to locate robots of this design very closely together, and they can pick up parts behind them without conflicting with each other.

The upper robot arm 5 comprises a tubular rear part 51, which is rotatable about the fourth axis D, and a tubular front part 52 which is journalled in a bearing 15 in the rear part and is rotatable about the longitudinal axis E of the arm.

The rotation of the front arm part 52 of the robot arm about the axis E is brought about with the aid of a fourth driving unit 16 secured to the rear arm part 51. In the embodiment shown, this driving unit is of the design described in the above-mentioned U.S. Pat. No. 4,997,413 and comprises a motor 17 with a tubular rotor 18, which is connected to the front part 52 via a reduction gear. The gear consists of a non-rotatable annular toothed wheel 20, which is cardanically suspended in the rear arm part 51 and which is urged by the rotor 18 to perform a wobbling motion and thereby engages into an annular toothed wheel 21 fixed to the front arm part 52. The rotor 18 and the gears 20, 21 are arranged coaxially with the longitudinal axis E of the robot arm and form an axial continuous channel.

The front part of the upper robot arm is provided with a robot wrist 30 of the design described in the above-mentioned U.S. Pat. No. 4,690,012. The wrist consists of three rotatable tubular parts 31, 32, 33 arranged in series with each other. The first wrist part 31 is secured to the front arm part 52 of the robot arm 5 and connected, via annular conical toothed wheels 34, 35, to the third wrist part 33.

The rotation of the second wrist part 32 is brought about with the aid of a fifth driving unit 22 which is arranged in the front arm part 52 and which is of the same type as the fourth driving unit 16 described above. The fifth driving unit 22 is connected to the second wrist part 32 via a tube 23, which is rotatably journalled in the upper robot arm and the front part of which is secured to an annular, conical toothed wheel 36, which is in engagement with an annular, conical toothed wheel 37 secured to the second wrist part 32.

A tubular tool attachment 40 is rotatably journalled in the third wrist part 33 and connected to a sixth driving unit 41 which is built into the same wrist part and which is of the same type as the fourth driving unit 16 described above.

The invention is not limited to the embodiment shown but several variants are possible within the scope of the claims. For example, the toothed wheels 9 and 10, respectively, which are secured to the two robot arms 2 and 5, need not be in direct engagement with each other but may also be in engagement with each other via an intermediate toothed wheel. Further, the driving units 3, 4 and 11 need not necessarily consist of driving motors with reduction gears but may, instead, consist of high-torque motors for direct operation. Nor do the driving units 16, 22 and 41 and the wrist 30 need to be of the design shown in the figures, but can be replaced by other known designs which have a continuous channel for cables, etc. Further, the operating range and the flexibility of the robot may be additionally increased by mounting the robot stand rotatably in a robot foot for rotation about a vertical axis and/or mounting it on a trackbound car to make possible a servo-controlled travelling motion.

In the embodiment described above, the positions of the different axes and robot parts are related to an embodiment in which the robot is positioned on a horizontal base. However, the invention is not limited to this method of mounting, but several other suitable methods of mounting can be applied, for example suspension mounting or lateral mounting.

What is claimed:

1. An industrial robot comprising a tubular lower robot arm, the lower end of which is pivotably journalled in a robot stand around a first axis and rotatably journalled around a second axis coinciding with the longitudinal axis of the arm, a tubular upper robot arm which is articulately connected to the upper end of the lower robot arm via an articulated joint member in the form of a tubular sleeve obliquely cut off at both ends, the articulated joint member being journalled in the lower robot arm and being rotatable about a third axis which intersects said second axis, a first driving unit mounted on the stand for pivoting the lower arm around said first axis, a second driving unit mounted at the lower end of the robot arm for rotating the lower robot arm about said second axis, and a third driving unit mounted at the lower end of the lower robot arm for rotating the lower robot arm about said second axis, and a third driving unit for rotating the articulated joint member about said third axis, wherein the upper robot arm comprises a tubular rear part which is journalled on said articulated joint member and is rotatable about a fourth axis which intersects said third axis, the upper robot arm further comprising a tubular front part which is journalled in said rear part, the upper end of the lower robot arm being secured to a first conical toothed wheel which engages with a second conical toothed wheel secured to the rear end of the upper robot arm, and a fourth driving unit being arranged in the rear part of the upper arm and being connected to the front part of the upper robot arm for rotation thereof about the longitudinal axis of the upper robot arm.

2. The industrial robot according to claim 1, wherein said third driving unit is arranged at the lower end of the lower robot arm and is connected to said articulated joint member via a tube rotatably journalled in the lower robot arm, the upper part of said tube being secured to a third conical toothed wheel which engages with a fourth conical toothed wheel secured to the articulated joint member.

3. The industrial robot according to claim 2 wherein said fourth driving unit comprises a motor with a tubular rotor and annular gears, said rotor and said annular gears being arranged coaxially with the longitudinal axis of the upper arm to form a continuous channel therethrough.

4. The industrial robot according to claim 3, wherein the front part of the upper robot arm supports a robot wrist which comprises a plurality of rotatable tubular parts arranged in a series with each other and which supports a tubular tool attachment, whereby a fifth driving unit, which is substantially of the same type as said fourth driving unit, is connected to one of said wrist parts via a tube rotatably journalled in the upper robot arm to bring about, together with the fourth driving unit, the desired orientation of the tool attachment.

5. The industrial robot according to claim 4 wherein the tool attachment is rotatably journalled in one of said wrist parts and is connected to a sixth driving unit contained within the wrist and being of substantially the same type as said fourth driving unit.

* * * * *